US010625925B1

(12) United States Patent
Jobe (10) Patent No.: US 10,625,925 B1
(45) Date of Patent: Apr. 21, 2020

(54) COMPOSTABLE OR RECYCLABLE COOLER (71) Applicant: Vericool, Inc., Livermore, CA (US)

(72) Inventor: Darrell Jobe, Livermore, CA (US)

(73) Assignee: Vericool, Inc., Livermore, CA (US)

( * ) Notice: Subject to any disclaimer, the term of this patent is extended or adjusted under 35 U.S.C. 154(b) by 0 days.

(21) Appl. No.: 16/172,571

(22) Filed: Oct. 26, 2018

Related U.S. Application Data (60) Provisional application No. 62/738,556, filed on Sep. 28, 2018.

(51) Int. Cl.
B65D 81/38 (2006.01)
B65D 65/46 (2006.01)

(52) U.S. Cl.
CPC ....... *B65D 81/3818* (2013.01); *B65D 65/466* (2013.01); *B65D 2565/386* (2013.01)

(58) Field of Classification Search
CPC ............ B65D 81/3818; B65D 81/3841; B65D 81/383; B65D 65/466; A47J 41/022
USPC .......................................... 220/592.23, 23.87
See application file for complete search history.

(56) References Cited

U.S. PATENT DOCUMENTS

| 1,641,030 | A |   | 8/1927  | Moses    |             |
| 1,701,323 | A |   | 2/1929  | Martin   |             |
| 1,845,970 | A |   | 2/1932  | Katz     |             |
| 2,194,301 | A |   | 3/1940  | Fourness |             |
| 2,231,981 | A |   | 2/1941  | Zalkind  |             |
| 2,808,976 | A |   | 10/1957 | Merle    |             |
| 2,941,708 | A |   | 6/1960  | Harold   |             |
| 3,416,692 | A |   | 12/1968 | Delbert  |             |
| 3,513,531 | A | * | 5/1970  | Zeunik ................... | A47J 41/022 29/419.2 |
| 3,539,075 | A | * | 11/1970 | Bautista ................. | A47G 19/12 220/23.87 |
| 5,062,527 | A |   | 11/1991 | Westerman |           |
| 5,180,060 | A | * | 1/1993  | Forti .................... | B65D 81/052 206/522 |

(Continued)

FOREIGN PATENT DOCUMENTS

| CN | 108177875 | 6/2018 |
| EP | 2000422   | 5/2012 |

(Continued)

OTHER PUBLICATIONS

PCT International Search Report and Written Opinion in International Appln. No. PCT/US2019/053659, dated Feb. 4, 2020, 12 pages.

*Primary Examiner* — Jeffrey R Allen
(74) *Attorney, Agent, or Firm* — Fish & Richardson P.C.

(57) ABSTRACT

A tub for a container includes an inner tub and an outer tub, each formed of a solid compostable or recyclable sheet formed primarily of plant fiber. Both the inner tub and the outer tub include a floor, a plurality of side walls that are coupled to the floor along common edges and each coupled to two adjacent side walls along common edges, and a rim provided at a top of the side walls. The rim of the inner tub rests on and is secured to the rim of the outer tub such that the side walls of the inner tub extend downwardly into the space between the side walls outer tub, with the side walls of the outer tub surrounding and spaced apart from the side walls of the inner tub. A volume between the side walls of the inner and outer tub provides a cavity.

28 Claims, 6 Drawing Sheets (56) References Cited

U.S. PATENT DOCUMENTS

| | | | |
|---|---|---|---|
| 5,208,267 A | 5/1993 | Neumann et al. | |
| 5,244,094 A | 9/1993 | Graff | |
| 5,266,763 A * | 11/1993 | Colombo | B65D 25/18 219/734 |
| 5,284,294 A | 2/1994 | Floyd | |
| 5,307,986 A | 5/1994 | Schuster | |
| 5,564,570 A | 10/1996 | Jaszai | |
| 5,634,569 A * | 6/1997 | DeCoster | A47G 19/30 206/519 |
| 5,758,513 A | 6/1998 | Smith | |
| 5,896,641 A | 4/1999 | Yamada | |
| 5,897,017 A | 4/1999 | Lantz | |
| 5,924,302 A | 7/1999 | Derifield | |
| 6,257,764 B1 | 7/2001 | Lantz | |
| 6,325,281 B1 | 12/2001 | Grogan | |
| 6,619,500 B1 | 9/2003 | Lantz | |
| 6,740,373 B1 | 5/2004 | Swoboda | |
| 6,938,968 B2 | 9/2005 | Tanimoto | |
| 8,557,367 B2 | 10/2013 | Netravali | |
| 8,617,684 B2 | 12/2013 | Nomura | |
| 8,763,811 B2 | 7/2014 | Lantz | |
| 9,550,618 B1 | 1/2017 | Jobe | |
| 10,046,901 B1 | 8/2018 | Jobe | |
| 10,059,495 B1 | 8/2018 | Korustan et al. | |
| 2002/0008113 A1 * | 1/2002 | Fujii | B65D 81/3818 220/592.2 |
| 2003/0082357 A1 | 5/2003 | Gokay | |
| 2003/0102317 A1 | 6/2003 | Gordon | |
| 2003/0146224 A1 * | 8/2003 | Fujii | A47J 41/022 220/592.27 |
| 2003/0152724 A1 | 8/2003 | Swoboda | |
| 2003/0217948 A1 | 11/2003 | Lantz | |
| 2004/0058119 A1 | 3/2004 | Wynne | |
| 2006/0230778 A1 | 10/2006 | Williams | |
| 2007/0051782 A1 | 3/2007 | Lantz | |
| 2008/0289302 A1 | 11/2008 | Vulpitta | |
| 2009/0001086 A1 | 1/2009 | Roderick et al. | |
| 2009/0265875 A1 | 10/2009 | Clamp et al. | |
| 2010/0258574 A1 | 10/2010 | Bentley | |
| 2010/0314397 A1 | 12/2010 | Williams | |
| 2011/0042449 A1 | 2/2011 | Copenhaver | |
| 2011/0100868 A1 * | 5/2011 | Lantz | B65D 81/051 206/584 |
| 2011/0248038 A1 | 10/2011 | Mayer | |
| 2012/0097067 A1 | 4/2012 | Fascio | |
| 2012/0279896 A1 | 11/2012 | Lantz | |
| 2013/0112694 A1 | 5/2013 | Bentley | |
| 2013/0112695 A1 | 5/2013 | Hall | |
| 2013/0140317 A1 | 6/2013 | Roskoss | |
| 2014/0021208 A1 | 1/2014 | Anti | |
| 2014/0093704 A1 | 4/2014 | Shi | |
| 2014/0144161 A1 | 5/2014 | Pointer | |
| 2014/0319018 A1 | 10/2014 | Collison | |
| 2014/0353317 A1 | 12/2014 | Ranade | |
| 2015/0158656 A1 | 6/2015 | McKinnon | |
| 2015/0336730 A1 | 11/2015 | Shields | |
| 2015/0344211 A1 | 12/2015 | Moon | |
| 2016/0023837 A1 | 1/2016 | Furneaux | |
| 2016/0052692 A1 | 2/2016 | Branham | |
| 2017/0043937 A1 | 2/2017 | Lantz | |
| 2017/0066582 A1 | 3/2017 | Vogel | |
| 2018/0229916 A1 | 8/2018 | Jobe et al. | |
| 2018/0237184 A1 | 8/2018 | Jobe et al. | |
| 2018/0237206 A1 | 8/2018 | Jobe et al. | |
| 2018/0305109 A1 | 10/2018 | Jobe et al. | |
| 2019/0329961 A1 | 10/2019 | Jobe | |

FOREIGN PATENT DOCUMENTS

| | | |
|---|---|---|
| JP | 10-236545 | 9/1998 |
| JP | 2000-053180 | 2/2000 |
| JP | 2000-229676 | 8/2000 |
| JP | 2000-255640 | 9/2000 |
| JP | 2003-300565 | 10/2003 |
| JP | 2014-189326 | 10/2014 |
| KR | 20-0438192 | 1/2008 |
| KR | 20-0443141 | 1/2009 |
| WO | WO 99-54228 | 10/1999 |
| WO | WO 2006/117801 | 11/2006 |

* cited by examiner

COMPOSTABLE OR RECYCLABLE COOLER

CROSS-REFERENCE TO RELATED APPLICATIONS

This application claims priority to U.S. Provisional Application Ser. No. 62/738,556, filed on Sep. 28, 2018, the disclosure of which is incorporated by reference.

TECHNICAL FIELD

This invention relates to a compostable or recyclable container.

BACKGROUND

A conventional cooler has a body with inner and outer walls formed of a molded plastic, e.g., polyethylene. Sandwiched between the walls is an insulating material, e.g., another plastic, or expanded polystyrene (EPS), e.g., Styrofoam. Alternatively, the cooler can be a single unitary body, e.g., entirely plastic or EPS, with no separate walls to hold the insulating material. For example, a cooler can be formed out of molded polystyrene. A coolant, e.g., ice, dry ice or a gel pack, can be placed in the cavity in the body of the cooler with the items being stored.

EPS is relatively inexpensive and easily formed into a variety of shapes, but is not recyclable or compostable. Similarly, plastics used for insulation are generally not recyclable. Consequently, disposing of the cooler can be a problem.

SUMMARY

A container that is compostable or recyclable, e.g., using curbside composting or recycling bins, is described.

In one aspect, a tub for a container includes an inner tub formed of a solid compostable or recyclable sheet formed primarily of plant fiber and/or starch, and an outer tub formed of a solid compostable or recyclable sheet formed primarily of plant fiber and/or starch. The inner tub includes a first floor, a plurality of first side walls that are coupled to the first floor along first common edges and each coupled to two adjacent first side walls along second common edges to surround an interior space of the tub, and a first rim provided at a top of the side walls. The outer tub includes a second floor, a plurality of second side walls that are coupled to the second floor along third edges and each coupled to two adjacent second side walls along fourth common edges, and a second rim provided at a top of the second side walls. The first rim of the inner tub rests on and is secured to the second rim of the outer tub such that the plurality of first side walls extend downwardly into the space between the plurality of second side walls with the plurality of second side walls surrounding and spaced apart from the plurality of first side walls. A volume between the plurality of first side walls and the plurality of second side walls provides a cavity.

Implementations may include one or more of the following features.

The plurality of first side walls may be inclined at an oblique angle relative to the first floor, and the plurality of second side walls may be inclined at the oblique angle relative to the second floor. At least two opposite sidewalls of the plurality of first side walls may include an inwardly extending first protrusion defining a recess in an outer side of the at least two opposite sidewalls. At least another two opposite sidewalls of the plurality of second side walls may include an inwardly extending second protrusion that fits into a complementary recess of an adjacent sidewall of the at least two opposite sidewalls. The second protrusion may be friction fit in the complementary recess. The second protrusion and the complementary recess may be wider at a lower end than an top end of the recess. The recess and the second protrusion may be trapezoidal.

The first rim of the inner tub may be secured to the second rim of the of the sidewall by an adhesive.

The cavity may be empty. A compostable or recyclable loose material may be placed in the cavity. The inner tub may be formed primarily of a first plant fiber, the outer tub may be formed primarily of the first plant fiber, and the loose material may include a starch or a different second plant fiber. The loose material may include starch pellets. The inner tub may be formed primarily of plant fiber, the outer tub may be formed primarily of plant fiber. The inner tub and the outer tub may be formed of a same plant fiber, e.g., a paper pulp or a vegetable fiber pulp.

A moisture barrier film may be formed over at least an inner surface of the inner tub. A moisture barrier film may be formed over an outer surface of the outer tub. A moisture barrier material may be mixed with the plant fiber and/or starch.

The first floor may be suspended above and spaced apart from the second floor, and a volume between of first floor and the second floor may provide a portion of the cavity. At least one of the first floor and the second floor may include projections extending to contact the other of the first floor and the second floor.

A container may include the tub and a lid. The lid may include an upper lid formed of a solid compostable or recyclable sheet formed primarily of plant fiber and/or starch, and a lower lid formed of a solid compostable or recyclable sheet formed primarily of plant fiber and/or starch. The upper lid may a first center portion, and a third rim portion surrounding the first center portion. The lower lid may include a second center portion, and a fourth rim portion surrounding the second center portion. The third rim of the upper lid may rest on and be secured to the fourth rim of the lower lid such that the first center portion is suspended above and spaced apart from the second center portion. A volume between the upper lid and the lower lid may provide a second cavity.

A rim of one of the tub or lid may include a projection to snap fit to a recess in a rim of the other of the tub or lid. A moisture barrier layer may coat at least a bottom surface of the lower lid.

Potential advantages may include (and are not limited to) one or more of the following. The container may be entirely compostable or recyclable, so all of the components of the container are easily disposable. The container may be thermally insulating, so the container can store cool materials, such as food. The container may be water resistant, so that condensation inside the container or leakage of water from wet materials does not degrade the container.

Optionally, liquid inside can drain from the container through one or more holes formed on a bottom surface of the container. Thus, danger of the material becoming soggy or soaking in accumulated water can be reduced.

The details of one or more embodiments are set forth in the accompanying drawings and the description below. Other features, objects, and advantages will be apparent from the description and drawings, and from the claims.

DESCRIPTION OF DRAWINGS

Like reference symbols in the various drawings indicate like elements.

DETAILED DESCRIPTION

Initially, some terminology may be beneficial. "Biodegradable" simply means that a product will eventually disintegrate into innocuous material. "Recyclable" indicates that a product can be reused or treated in order to be made suitable for reuse. While many materials could be recycled by special processes, "street-side recyclable" indicates materials commonly permitted to be disposed in street-side residential or business recycling bins for collection and recycling by municipal waste disposal agencies (i.e., as of 2018). "Compostable" indicates both that a product will decompose quickly, e.g., within 180 days, and that the product will decompose into material that can be used as fertilizer (e.g., per ASTM D6400 or EN 13432). Products that are "biodegradable" need not be (and usually aren't) "compostable." First, since there is no particular time limit for a "biodegradable" product to disintegrate, it need not decompose quickly. For example, even aluminum cans will biodegrade given several centuries. Moreover, even a biodegradable product that decomposes quickly might not provide a material that is suitable as fertilizer.

Most conventional thermally insulating materials for containers, e.g., EPS, are not compostable or street-side recyclable.

One technique for forming a container having at least some thermal insulative capability is to form inner and outer walls of the container from a compostable or street-side recyclable material, e.g., a compressed organic fiber pulp, e.g., plant fiber pulp. The space between the inner and outer walls can be empty, or could be filled with another compostable or street-side recyclable insulating material in loose form, e.g., starch pellets or organic fibers. At least the inner wall of the container can be coated with a moisture barrier, which can be a biodegradable or street-side recyclable layer.

Figure 1A:
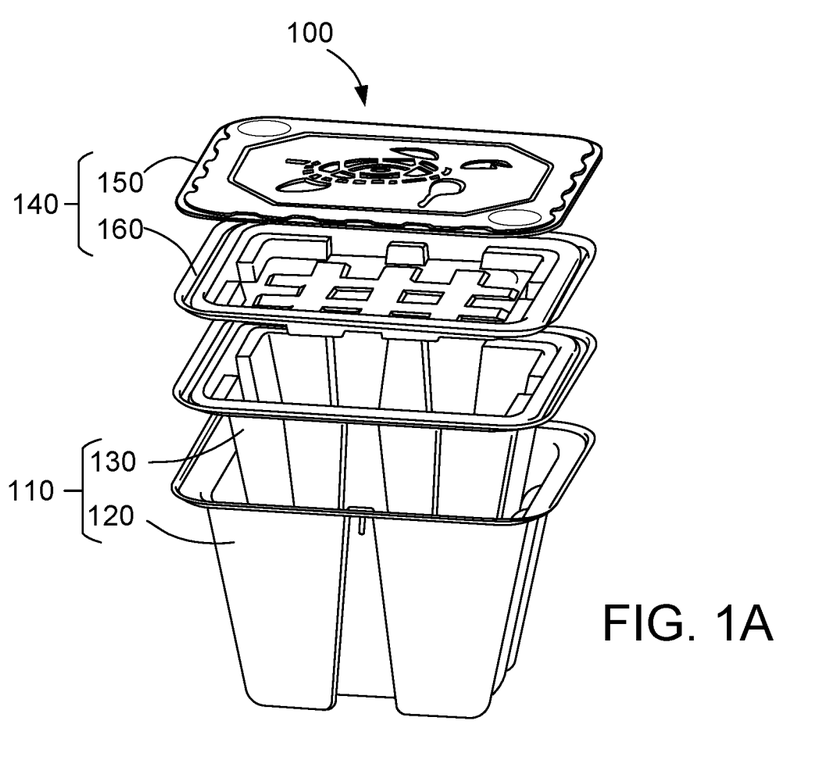
FIGS. 1A, 1B and 1C are each an exploded perspective view of a container.
Figure 1B:
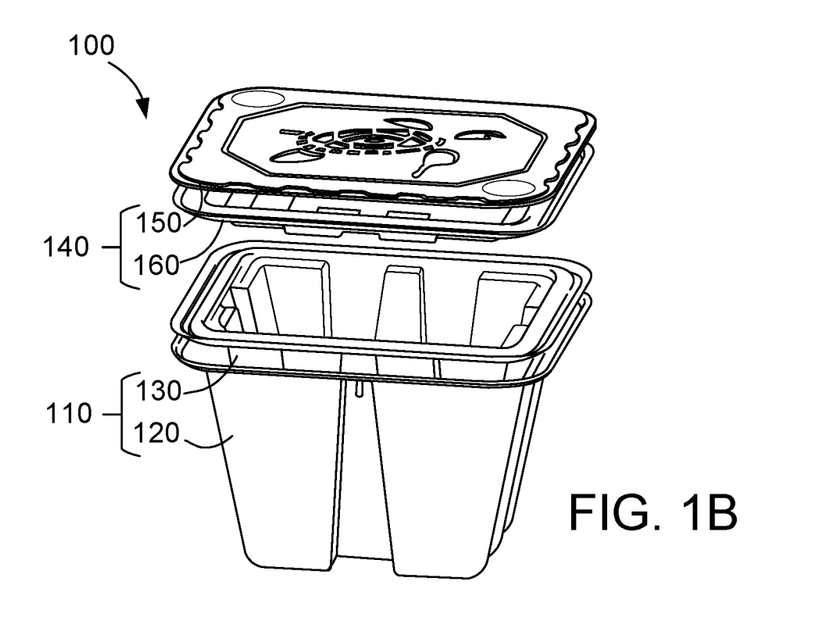
Figure 1C:
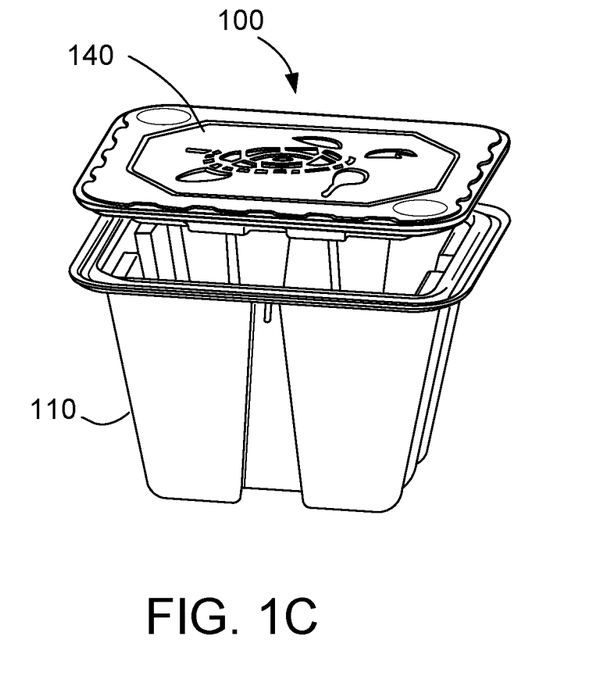
Figure 1D:
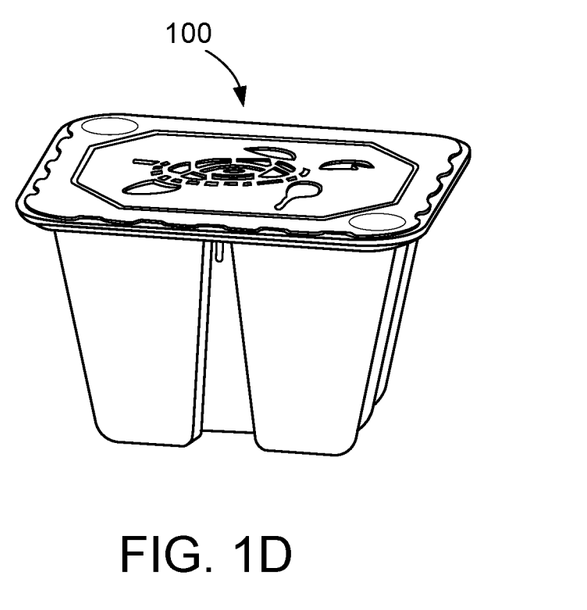
FIG. 1D is a perspective view of an assembled container.

FIGS. 1A, 1B and 1C are exploded perspective views of a container 100. FIG. 1D is a perspective view of an assembled container 100.

In some implementations, the container 100 is entirely compostable, i.e., consists of compostable materials. In some implementations, the container 100 is entirely street-side recyclable, i.e., consists of street-side recyclable materials. In some implementations, the container is formed of a combination of compostable and street-side recyclable materials.

The container includes a tub 110 and a cover 140 that fits on the top of the tub 110. The tub 110 is a generally a frustrum, e.g., a right rectangular frustrum, that is open at the wider end. That is, the tub has a horizontal rectangular bottom and side walls that extend at an oblique angle from the outer edges of the bottom. The oblique angle may be 45-80° relative to the bottom. The tub 110 is open at its top to provide access to an interior space 114 of the container to store items.

The cover 140 is generally a flat panel, e.g., generally a rectangular solid. The cover 140 can fit over the opening in the top of the tub 110 to seal the interior space 114. A width of the interior space 114 can be 3-48 inches. In some implementations, the interior space 114 can have a square shape. In some other implementations, the interior space 114 can have a rectangular shape. In some other implementations, the interior area 114 can have a circular shape. The interior space 114 can have a volume of 8-400 quarts, e.g., 16-64 quarts.

The edges of the tub and cover can be beveled or rounded without departing from the general shapes noted above.

Referring to FIGS. 1A-1C and 2A-2B, the tub 110 is formed out of an outer tub 120 and an inner tub 130. Each of the outer tub 120 and the inner tub 130 is a relatively thin sheet formed into a generally right rectangular frustrum that is open at its wider end.

For example, the outer tub 120 includes a generally rectangular floor 122 and side walls 124 that extend at the oblique angle from the outer edges of the floor 122. Rims 126 can extend outwardly from the upper edges of the side walls 124.

Similarly, the inner tub 130 includes a generally rectangular floor 132 and side walls 134 that extend at the oblique angle from the outer edges of the floor 132. Rims 136 can extend outwardly from the upper edges of the side walls 134.

Figure 2A:
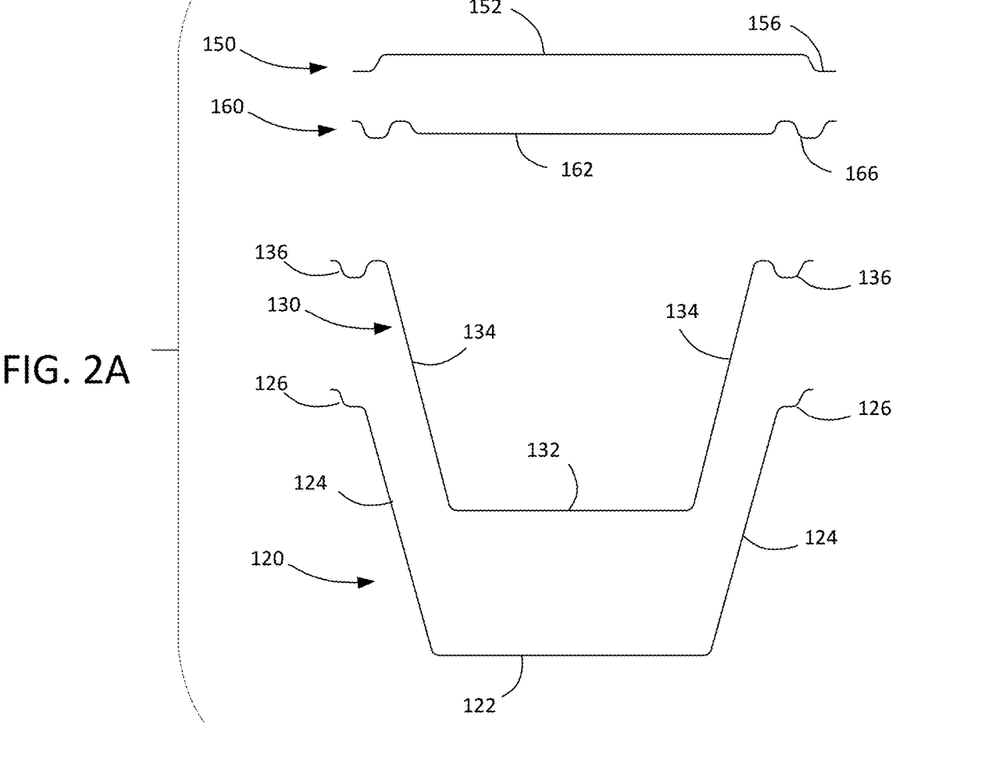
FIGS. 2A and 2B are each a schematic exploded cross-sectional side view of the container.
Figure 2B:
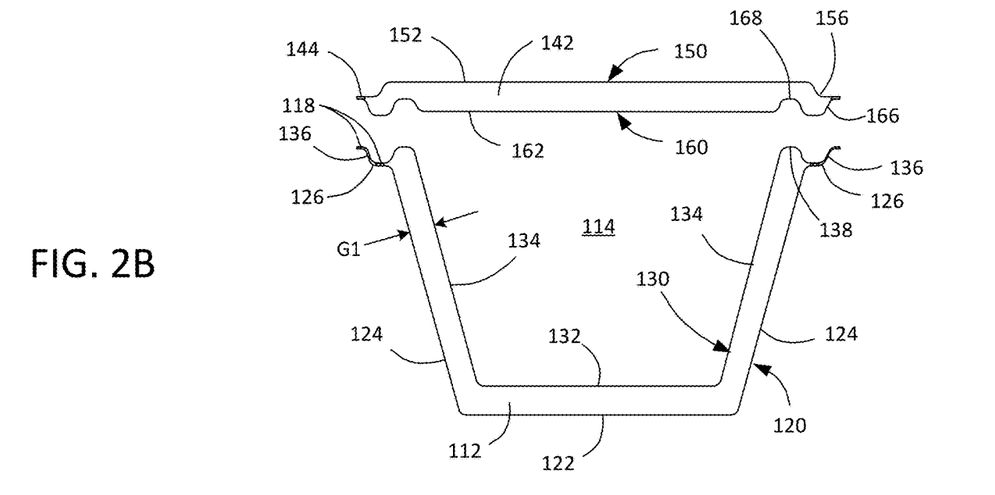

As shown in FIG. 2B, the rim 136 of the inner tub 130 sits on the rim 126 of the outer tub 120. The rims 126, 136 can be secured, e.g., by an adhesive. The frustrum portion of the inner tub 130 is narrower than the frustrum portion of the outer tub 120, so as to leave a gap between the side walls 126 and 136 of the inner tub 130 and outer tub 120, respectively. Optionally there can be a gap between the floor 132 of the inner tub 130 and the floor 126 of the outer tub 120. The gap between the outer tub 120 and the inner tub 130 defines a cavity 112 enclosed by the tub 110. The outer tub 120 and the inner tub 130 provide shell of material surrounding the cavity 112. The width of the gap G1 between the inner tub 130 and the outer tub 120 can be about 0.25-2 inches, e.g., 0.5-1 inch. Although the gap is illustrated as having a uniform width, this is not necessary. Returning to FIGS. 1A-1C and 2A-2B, the lid 140 is formed out of an upper lid 150 and a lower lid 160. Each of the upper lid 150 and the lower lid 160 is a relatively thin sheet formed into a generally flat rectangle.

The upper lid 150 includes a generally rectangular center portion 152 and rims 156 that extend outwardly from the outer edges of the center portion 152. Similarly, the lower lid 160 includes a generally rectangular center portion 162 and rims 166 that extend outwardly from the outer edges of the center portion 162.

As shown in FIG. 2B, the rim 156 of the upper lid 150 sits on the rim 166 of the lower lid 160. The rims 156, 166 can be secured, e.g., by an adhesive. The rims are shaped such that when the rims are in contact, there is a gap between the center portion 152 of the upper lid 150 and the center portion 166 of the lower lid 160. The gap between the upper lid 150 and the lower lid 160 defines a cavity 142 within the lid 140. The upper lid 150 and lower lid 160 provide shell of material surrounding the cavity 142.

The lower lid 160 can be formed to have an upwardly extending recess 168 at the periphery of the lid lower 160. In addition, the inner tub 130 can be formed to have an upwardly extending protrusion 138 at the periphery of the inner tub 130. The protrusion 138 on the tub 110 can be shaped to provide a friction-fit or snap-fit into the recess 168 in the cover 150 so that the lid 140 can be removably secured to the tub 110. Alternatively or in addition, a downwardly extending recess can formed in the inner tub and a downwardly extending protrusion can be formed in the cover.

Each component of the container 100, i.e., the outer tub 120, the inner tub 130, the upper lid 150, and the lower lid 160, is a body primarily formed of a compostable and/or street-side recyclable material. In this context, "solid" indicates that the component holds together as a single unit.

As noted above, each component is formed out of a relatively thin "sheet." That is, although formed into various non-planar shapes (e.g., the inner tub, the outer tub, etc.), each component has a thickness that is relatively uniform. Projections or recesses can be provided by shaping of the sheet (rather than by protrusions or depressions that increase or decrease the thickness of the sheet).

Each sheet can have a thickness of about 0.5 mm to 25 mm, e.g., 1.5 mm to 25 mm, e.g., 3 mm to 25 mm, e.g., 1.5 mm to 3 mm. A sufficiently thick sheet, e.g., 1.5 mm or more, can improve the structural rigidity of the container to enable the container to hold significantly greater weight, e.g., at least 50 lb., e.g., 50-200 lb, 50-100 lb or 100-200 lb.

Each component can be formed of the same material. Each component can have a uniform homogenous composition.

Examples of the compostable and/or street-side recyclable material(s) for forming the components are plant fibers, starch, or a combination of thereof. The plant fiber can be a paper pulp or a vegetable fiber pulp. For example, the plant fibers could be fibers from coconut husk, corn husk, linen, cotton, bamboo or bagasse. In some cases, a combination of plant fibers from different plants can be used. The starch can be a grain starch, e.g., a corn starch, a wheat starch or sorghum (sorghum is also known as milo), a root starch, e.g., a potato starch, or a vegetable starch. In some cases, a combinations of different starches can be used.

In some implementations, the components consist of plant fiber. In some cases, a combination of starch and plant fiber can be used; the components can consist of starch and plant fiber.

Other materials that do not interfere with the compostable or street-side recyclable nature of the components, e.g., a preservative or anti-fungal agent, an adhesive, or a softener, can be present, but only in small quantities. For example, at least 85%, e.g., at least 90-95%, by weight of the body 110 is plant fiber and/or starch. Polyvinyl alcohol can be present, e.g., 5-10% by weight.

Each component is a "continuous" unitary layer. In this context, "continuous" indicates that the portions are joined without a discontinuity in material composition; there is no gap, adhesive, melted region, or similar disruption in the material composition to indicate a seam.

For the outer tub 120, the floor 122 is joined "continuously" to the side walls 124 along the outer edges of the floor 122, and each of the side walls 124 is joined "continuously" to its adjacent side walls along common edges. Similarly, for the inner tub 130, the floor 132 is joined "continuously" to the side walls 134 along the outer edges of the floor 132, and each of the side walls 134 is joined "continuously" to its adjacent side walls along common edges.

In some implementations, the surfaces of the tub 110 are generally flat. In some other implementations, the inner tub 130 has one or more outwardly extending recesses, e.g., to hold an ice pack or gel pack. Similarly, in some implementations, the inner tub 130 has various inwardly extending projections, e.g., tabs or struts, e.g., to assist in positioning of the item to held or for increased structural support. In addition, in some implementations, the outer surfaces of the body can have various projections, e.g., pads or struts, e.g., to provide increased structural support or cushioning.

Figure 2C:
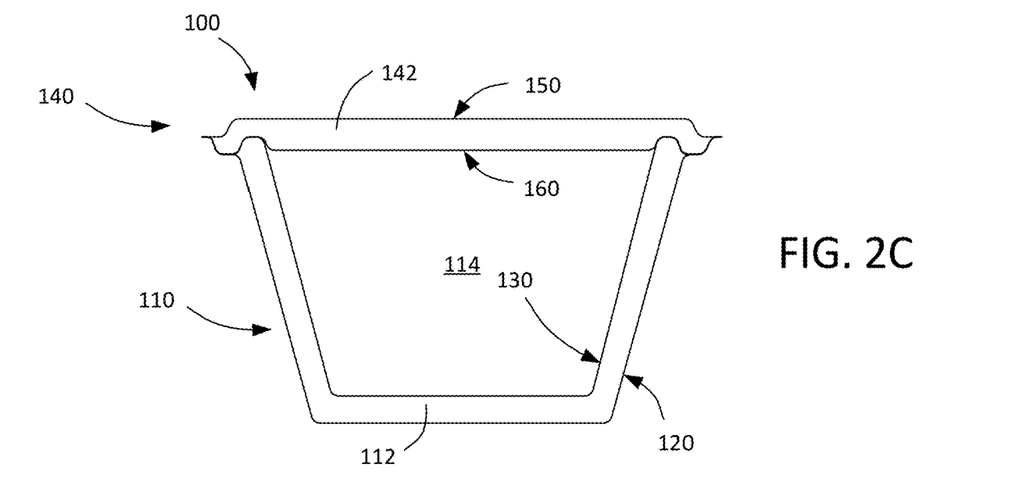
FIG. 2C is a schematic cross-sectional side view of the assembled container.

Referring to FIG. 2C, in some implementations, the cavity 112 inside the tub 110 and the cavity 142 inside the lid 140 can be empty, i.e., air filled.

Referring to FIG. 2D, in some implementations, the cavity 112 inside the tub 110 and/or and the cavity 142 inside the lid 140 contains a filler material 180. In particular, the cavity 112 and/or cavity 142 can contain compostable or street-side recyclable material(s).

In some implementations, the filler is loose material, e.g., pellets, shredded material, fibers, powder, etc. For example, the core can be composed of starch pellets, shredded paper, loose plant fibers, starch powder, etc. Optionally the loose material can be compacted within the shell of material surrounding the cavity 112 and/or cavity 142.

In some implementations, the shell and the filler have different compositions. For example, the shell can be primarily formed plant fiber whereas the filler is primarily formed of starch. As another example, the shell can be primarily formed of a first kind of plant fiber, e.g., a paper, and the filler can be formed of a second kind of plant fiber, e.g., coconut husk or corn husk. As another example, the shell can be primarily formed of a starch, while the filler can be primarily formed of a plant fiber. As another example, the shell can be primarily formed of a first kind of starch, e.g., corn starch, while the filler can be primarily formed of a second kind of starch, e.g., root starch.

As another example, the shell can be primarily formed of starch or plant fiber while the filler is formed primarily of a street-side recyclable plastic, e.g., polyethylene. For example, the filler can be shredded polyethylene or polyethylene pellets. In this example, the shell is compostable and recyclable while the core is recyclable. As another example, the shell can be formed of a street-side recyclable plastic, e.g., polyethylene, and the filler can be primarily formed of starch or plant fiber.

In some implementations, the shell and the filler can have the same composition, but the composition of the shell and the composition of the filler can be differently processed. For example, both the shell and the filler can be primarily formed of a plant fiber. However, the plant fiber used for the shell can be processed at a first temperature during a drying process while the plant fiber used for the filler can be processed at a second temperature during a drying process.

In some implementations, the shell and the filler can have different firmness. For example, the shell can be primarily formed of a material that is harder than the material that provides the filler.

Alternatively, the shell and the filler can have the same compositions.

In some implementations, the size of the cavity 112, the material in the cavity (if any), and the material of the tub 110 can act in conjunction to provide sufficient thermal insulation for the container to act as a cooler for common leisure applications, e.g., keeping perishable food cool for 4-24 hours.

Figure 3:
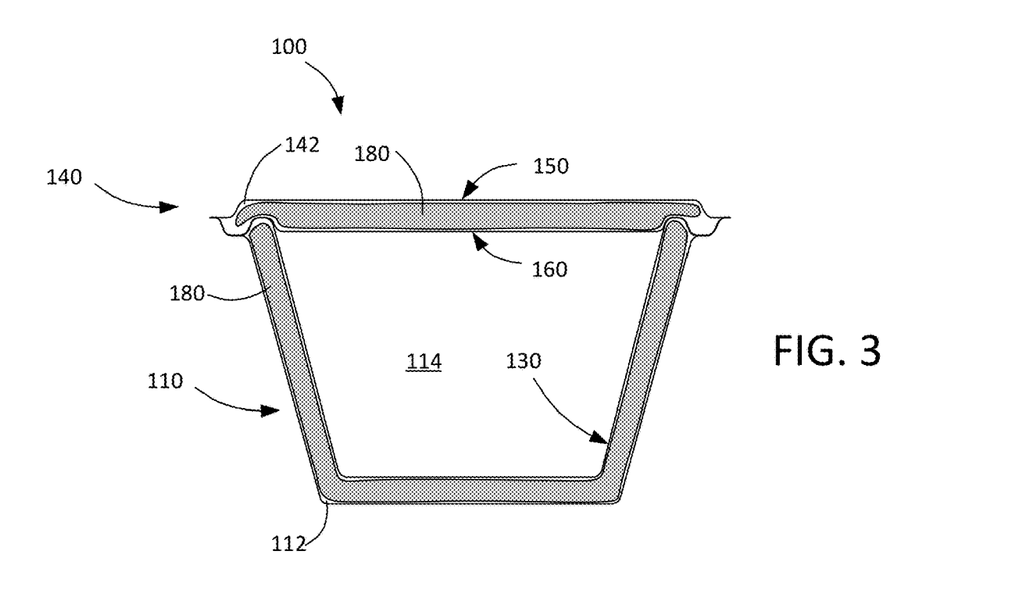
FIG. 3 is a schematic cross-sectional side view of the assembled container having a filler material disposed in the lid and tub.
Figure 4:
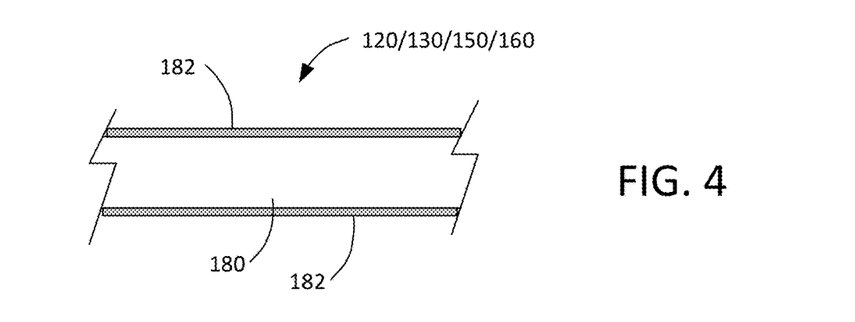
FIG. 4 is a schematic cross-sectional view of a sheet that provides a component from the container.

Referring to FIG. 4, one or more of the component sheets (e.g., inner tub 130, outer tub 120, upper cover 150, lower cover 160) can include a moisture barrier layer. As shown in FIG. 4, the component can include a sheet 180, e.g., formed of the plant fiber, and a moisture barrier layer 182 formed on one or both sides of the sheet 180. The moisture barrier layer 1820 can be water-proof, water-resistant or water-repellant layer. Referring to FIGS. 3 and 4, in some implementations, the moisture barrier layer 182 is formed only on the interior surface of the tub 100 that surround the interior space 114, i.e., the inner surface of the inner tub 130 and the lower surface of the lower cover 160. In some implementations, the moisture barrier layer 182 is formed only on the exterior surfaces of the tub 110 and the cover 150, i.e., the inner surface of inner tub 130, the outer surface of outer tub 120, the upper surface of upper cover 150, and the lower surface of lower cover 160. In some implementations, the moisture barrier layer 182 fully encloses each component.

The moisture barrier layer 182 can be a biodegradable or compostable layer. The layer 182 prevents or inhibits water from penetrating the layer 182, e.g., from escaping the interior 114. In some implementations, the moisture barrier layer 182 can be air-tight. The moisture barrier 182 need not impart any particular significant stability to the component; rigidity of the component comes from the material of the sheet 180.

In some implementations, the moisture barrier layer 182 can be compostable. For example, the moisture barrier layer can be a wax. As another example, the moisture barrier layer can be a compostable plastic, e.g., a bioplastic that meets ASTM D6400 standards. Example materials for a compostable layer include polymers based on one or more of polylactic acid (PLA), poly(beta-amino) esters (PBAE), polyhydroxyalkanoate (PHA), polycapralactones (PCL), polybutyrate adipate terephthalate (PBAT) polyvinylalcohol (PVA), or ethylene vinyl alcohol (EVOH). In addition, any combinations of these materials can be used for the moisture barrier layer 182. For example, a combination of PBAT and PE can be used for the moisture barrier layer 182. As another example, a combination of PE and PLA can be used for the moisture barrier layer 182.

In some implementations, the layer 182 can be street-side recyclable and biodegradable. A suitable material for the layer 182 is polyethylene, e.g., a polyethylene film. For example, the layer can include LDPE, MDPE, HDPE, or polyethylene terephthalate. An advantage of polyethylene is ease of fabrication and good water resistance.

In some implementations, there is no separate moisture barrier layer, but a moisture barrier material, e.g., one of the polymers discussed above, can be mixed with an organic product, e.g., the plant fibers or pulp, that provides the components.

The moisture barrier layer 182 can be applied in liquid form and then harden on the sheet 180. Alternatively, the layer 182 can be sprayed onto the sheet 180. The sprayed-on layer can provide a moisture barrier. For example, a waterproof, water-resistant or water-repellant material can be sprayed onto the panel. In some implementations the layer can be polylactic acid (PLA).

A problem with starch-based insulation is that it dissolves easily in water. If the item being stored is cold or a coolant is placed in the interior of the container 100, condensation can form on the interior surfaces of the container 100. However, the moisture barrier layer 182 prevents liquid, e.g., the condensation, from reaching the material of the sheet 180, e.g., the starch or plant fiber. However, in some implementations, the sheet 180 of the component is exposed to the environment, i.e., there is no layer coating or surrounding the component.

Figure 5:
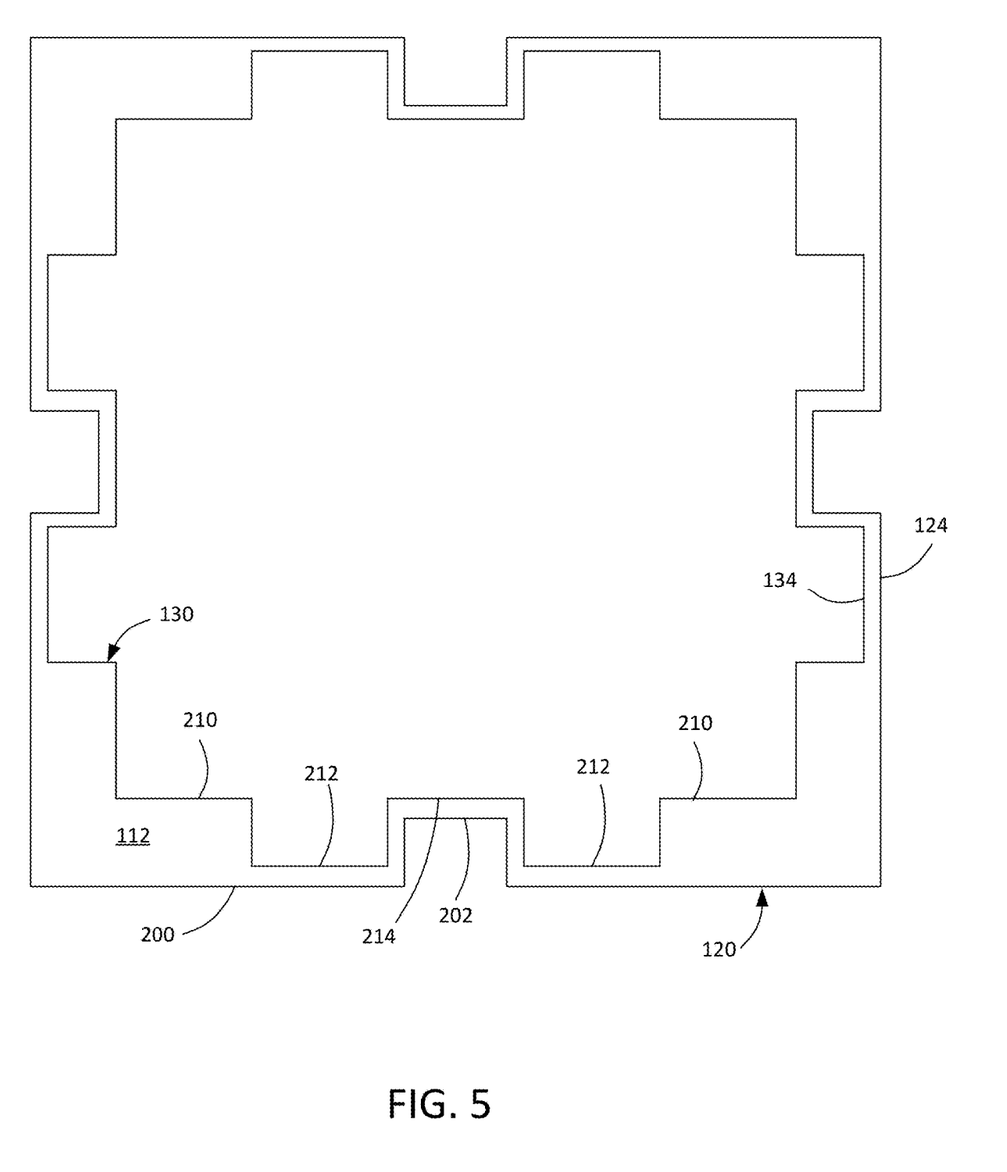
FIG. 5 is a schematic cross-sectional top view of the container.

Referring to FIGS. 1A-1D, the side walls of the outer tub 120 and inner tub 130 need not be completely flat. Rather, the side walls of the outer tub 120 and inner tub 130 can include various recesses or projections. FIG. 5 illustrates a cross sectional view through the tub 110, showing both the outer tub 120 and the inner tub 130.

Referring to FIGS. 1A-1D and FIG. 5, each sidewall 124 of the outer tub 120 can include an indentation 202 extending inwardly from a generally flat portion 200 of the side wall 124. The indentation 202 can be wider at the bottom of the sidewall 124 (at the floor 122) than at the top of the sidewall 124. For example, the indentation 202 can be trapezoidal. The indentation 202 can terminate before the lip 126 of the outer tub 120.

Each sidewall 134 of the inner tub 130 can include two outwardly extending projections 212 from a generally flat portion 210. A portion of the sidewall 134 between the two projections 212 provides a recess 214. The recess 214 can be wider at the bottom of the sidewall 134 (at the floor 122) than at the top of the sidewall 134. For example, the recess 214 can be trapezoidal. The indentation 202 can terminate before the lip 126 of the outer tub 120.

The space between the generally flat portion 210 of the sidewall 134 of the inner tub 130 and the generally flat portion 200 of the sidewall 124 of the outer tub 120 provide the cavity 112.

The recess 214 in the inner tub 130 and the indentation 202 in the outer tub 120 have complementary shapes such that indentation 202 fits tightly into the recess 214 (FIG. 5 illustrates a small gap for clarity of illustration). This permits the inner tub 130 to be friction fit to the outer tub 120. This can provide improved structural stability, as compared to using solely adhesive to attach the inner tub 130 and outer tub 120 at the rims 126, 136. Although FIGS. 1A-1D illustrate one indentation and recess per side wall, there could be multiple interlocking indentations and recesses.

On the interior side of the inner tub 130, the projections 212 provide grooves for air flow to improve uniformity of flow of cold air across the item held in the interior space 114. Alternatively or in addition, the grooves can provide space to place a coolant, e.g., ice or a gel pack.

Figure 6:
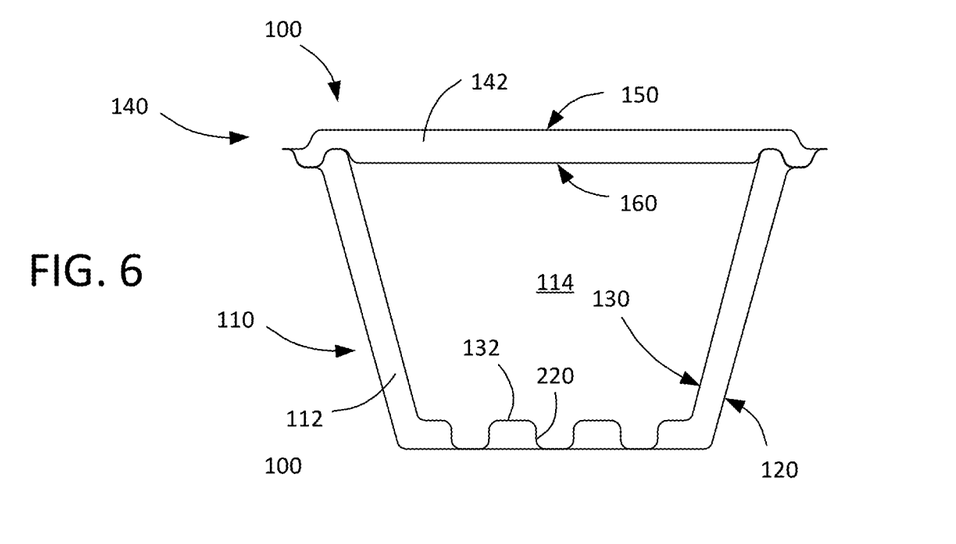
FIG. 6 is a schematic cross-sectional side view of another implementation of the assembled container.

Referring to FIG. 6, in some implementations, which can be combined with the features described above, the floor 132 of the inner tub 130 includes one or more projections 220 that extend downwardly to contact the floor 122 of the outer tub 120. Alternatively or in addition, the floor 122 of the outer tub 120 can include one or more projections that extend upwardly to contact the floor 132 of the inner tub 130. Such projections can provide structural support to increase the weight that can be held by the inner tub 130 without damaging the floor 132.

In some implementations, which can be combined with any of the features described above, the inner tub 130 has various projections, e.g., tabs or struts, e.g., to assist in positioning of the item to be stored or for increased structural support.

In some implementations, which can be combined with any of the features described above, the floor 122 of the outer tub 120 can include one or more projections that extend downwardly. Such projections can provide structural support and/or absorb shock when the container 100 is placed on a support surface, e.g., the ground.

In some implementations, which can be combined with any of the features described above, the container 100 can include horizontally extending indentations in two opposite side walls 124 of the outer tub 120. The indentations provide hand-holds for a user to carry the container 100.

In some implementations, which can be combined with any of the features described above, the floor of the tub 110 includes one or more conduits extending from the floor 132 of the inner tub 130 to the floor 122 of the outer tub 120. Any liquid in the interior area 114 can be drained to the exterior of the container 100 through the conduits.

Although the tub 1100 illustrated in FIGS. 1A-1D is generally trapezoidal, the tub can have box-like shape, e.g., be a generally rectilinear prism, or have other cross-sectional shapes, e.g., octagonal, cylindrical, etc., with or without the slant of the sidewalls.

Figure 7:
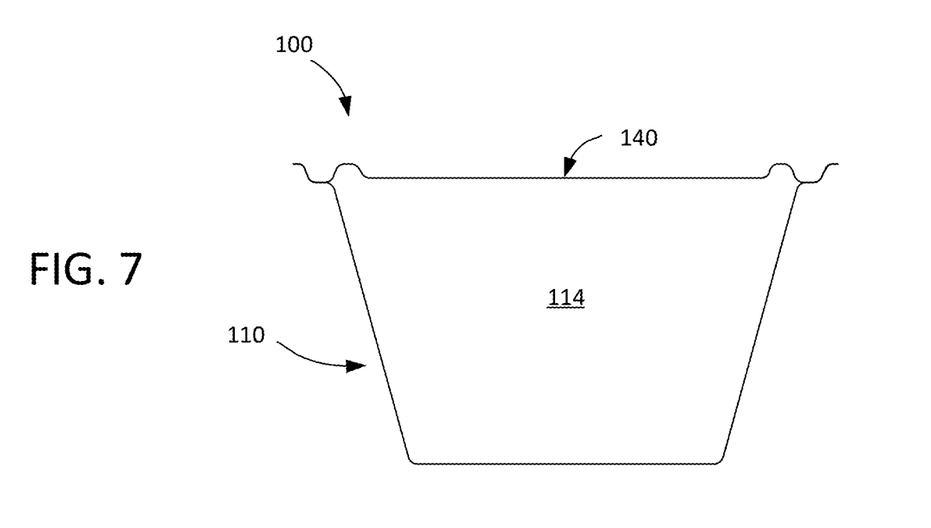
FIG. 7 is a schematic cross-sectional side view of another implementation of the container.

Referring to FIG. 7, in some implementations, the tub 110 and the lid 140 are each formed of only a single sheet, and do not include a cavity 112 or cavity 142. The sheet forming the tub 100 can be similar to the sheet forming the outer tub 120 or the inner tub 130, and the sheet forming the lid 140 can be sheet forming the upper lid 150 or the lower lid 160.

To manufacture the container 100, the plant fibers are ground to the appropriate size and added to a liquid to form a slurry. For example, used paper products, e.g., cardboard, can be recycled by grinding the paper product and adding water to form a recycled wood pulp. Also if appropriate, the moisture barrier material is added to the slurry. The slurry is then fed to a vacuum former to create a mold of the desired shape, e.g., one of the components described above. In brief, a screen having the desired shape for the component is lowered into a reservoir of the slurry, and vacuum is applied to suction the fibrous material (and additives) onto the screen. The screen is removed from the reservoir, and can be placed into a mating plate. This can compress the slurry accumulated on the screen to remove liquid and form the sheet. Optionally heat can be applied. The components can then be assembled, e.g., adhesively attached as shown in FIGS. 2A and 2B.

In some implementations, the container 100 is entirely compostable, i.e., consists of compostable materials. If both the tub 110 and cover 150 are compostable, the entire container 100 can be disposed of as a unit in a composting bin.

In some implementations, the container 100 is entirely street-side recyclable, i.e., consists of street-side recyclable materials. If both the tub 110 and cover 150 are street-side recyclable, the entire container 100 can be disposed of as a unit in a recycling bin.

In some implementations, the container is formed of a combination of compostable and street-side recyclable materials. In particular, the various components (outer tub 120, inner tub 130, upper cover 150, lower cover 160) can consists of street-side recyclable materials, e.g., plant fiber pulp, whereas the filler material in the cavities 112, 142 can consist of compostable materials, e.g., starch in pellet or powder form.

CONCLUSION

It should be understood that, although various terms such as "top", "bottom", "vertical," and "lateral" are used, these terms indicate relative positioning of components under the assumption that an opening to the box 20 is at the top, and don't necessarily indicate an orientation relative to gravity; in use, or even during assembly, the container 10 could be on its side or upside down relative to gravity. The term "slightly" indicates no more than about 5%, e.g., no more than 2%.

A number of embodiments have been described. Nevertheless, it will be understood that various modifications may be made without departing from the spirit and scope of the invention. Accordingly, other embodiments are within the scope of the following claims.

What is claimed is:
1. A tub for a cooler, the tub comprising:
an inner tub formed of a solid compostable or recyclable sheet formed primarily of plant fiber, the inner tub including
a first floor,
a plurality of first side walls that are continuously coupled to the first floor along first common edges and each continuously coupled to two adjacent first side walls along second common edges to surround an interior space of the tub, at least one of the plurality of first side walls providing a planar vertically-extending recess between two outwardly extending projections, and
a first rim provided at a top of the side walls, the vertically-extending recess extending from the first floor to the first rim; and
an outer tub formed of a solid compostable or recyclable sheet formed primarily of plant fiber, the outer tub including
a second floor,
a plurality of second side walls that are continuously coupled to the second floor along third edges and each continuously coupled to two adjacent second side walls along fourth common edges, at least one of the plurality of second side walls having a planar vertically-extending indentation extending inwardly into the vertically-extending recess provided between two outwardly extending projections of the at least one of the plurality of first side walls, and
a second rim provided at a top of the second side walls, the vertically-extending recess extending from the second floor to the second rim,
wherein the first rim of the inner tub rests on and is secured to the second rim of the outer tub such that the plurality of first side walls extend downwardly into a space between the plurality of second side walls with the plurality of second side walls surrounding and spaced apart from the plurality of first side walls, and wherein a volume between the plurality of first side walls and the plurality of second side walls provides a cavity.

2. The tub of claim 1, wherein the plurality of first side walls are inclined at an oblique angle relative to the first floor and the plurality of second side walls are inclined at the oblique angle relative to the second floor.

3. The tub of claim 1, wherein at least two opposite sidewalls of the plurality of first side walls include an inwardly extending first protrusion defining a recess in an outer side of the at least two opposite sidewalls, and wherein at least another two opposite sidewalls of the plurality of second side walls include an inwardly extending second protrusion that fits into a complementary recess of an adjacent sidewall of the at least two opposite sidewalls.

4. The tub of claim 3, wherein the second protrusion is friction fit in the complementary recess.

5. The tub of claim 3, wherein the complementary recess and the second protrusion are wider at a lower end than a top end of the recess.

6. The tub of claim 5, wherein the complementary recess and the second protrusion are trapezoidal.

7. The tub of claim 1, wherein the first rim of the inner tub is secured to the second rim of the outer tub by an adhesive.

8. The tub of claim 1, wherein the cavity is empty.

9. The tub of claim 1, comprising a compostable or recyclable loose material in the cavity.

10. The tub of claim 9, wherein the inner tub is formed primarily of a first plant fiber, the outer tub is formed primarily of the first plant fiber, and the loose material comprises a starch or a different second plant fiber.

11. The tub of claim 10, wherein the loose material comprises starch pellets.

12. The tub of claim 1, wherein the inner tub and the outer tub are formed of a same plant fiber material.

13. The tub of claim 12, wherein the same plant fiber material comprises a paper pulp.

14. The tub of claim 12, wherein the same plant fiber material comprises a vegetable fiber pulp.

15. The tub of claim 1, comprising a moisture barrier film formed over at least an inner surface of the inner tub.

16. The tub of claim 15, comprising a moisture barrier film formed over an outer surface of the outer tub.

17. The tub of claim 1, comprising a moisture barrier material mixed with plant fiber and/or starch.

18. The tub of claim 1, wherein the first floor is suspended above and spaced apart from the second floor, and wherein a volume between the first floor and the second floor provides a portion of the cavity.

19. The tub of claim 1, wherein at least one of the first floor and the second floor includes projections extending to contact the other of the first floor and the second floor.

20. A container comprising,
the tub according to claim 1; and
a lid, the lid including
an upper lid formed of a solid compostable or recyclable sheet formed primarily of plant fiber and/or starch, the upper lid including
a first center portion, and
a third rim portion surrounding the first center portion,
a lower lid formed of a solid compostable or recyclable sheet formed primarily of plant fiber and/or starch, the lower lid including
a second center portion, and
a fourth rim portion surrounding the second center portion, the fourth rim portion including,
wherein the third rim portion of the upper lid rests on and is secured to the fourth rim portion of the lower lid such that the first center portion is suspended above and spaced apart from the second center portion, and wherein a volume between the upper lid and the lower lid provides a second cavity.

21. The container of claim 20, wherein a rim of one of the tub or lid includes a projection to snap fit to a recess in a rim of the other of the tub or lid.

22. The container of claim 20, comprising a moisture barrier layer coating at least a bottom surface of the lower lid.

23. A container, comprising:
an inner tub formed of a solid compostable or recyclable sheet formed primarily of plant fiber, the inner tub including
a first floor,
a plurality of first side walls that are continuously coupled to the first floor along first common edges and each continuously coupled to two adjacent first side walls along second common edges to surround an interior space of the inner tub, at least one of the plurality of first side walls providing a recess between two outwardly extending projections, and
a first rim provided at a top of the side walls; and
an outer tub formed of a solid compostable or recyclable sheet formed primarily of plant fiber, the outer tub including
a second floor,
a plurality of second side walls that are continuously coupled to the second floor along third edges and each continuously coupled to two adjacent second side walls along fourth common edges, at least one of the plurality of second side walls having a vertically-extending indentation extending inwardly into the recess provided between two outwardly extending projections of the at least one of the plurality of first side walls, wherein the indentation extends inwardly into the recess while maintaining a gap between the recess and the indentation, and
a second rim provided at a top of the second side walls, the vertically-extending indentation extending from the second floor to the second rim,
wherein the first rim of the inner tub rests on and is secured to the second rim of the outer tub such that the plurality of first side walls extend downwardly into a space between the plurality of second side walls with the plurality of second side walls surrounding and spaced apart from the plurality of first side walls, and wherein a volume between the plurality of first side walls and the plurality of second side walls provides a cavity.

24. The container of claim 23, wherein the recess has a planar recess surface and two planar recess side-surfaces connecting the planar recess surface to a remainder of the first side wall having the recess, and the indentation has a planar indentation surface and two planar indentation side-surfaces connecting the planar indentation surface to the remainder of the second side wall having the indentation.

25. The container of claim 24, wherein the planar recess surface is separated from the planar indentation surface by a gap.

26. The container of claim 25, wherein the planar recess surface and the planar indentation surface are parallel.

27. The container of claim 24, wherein the two planar recess side-surfaces include a first recess side-surface and a second recess side-surface, and the two planar indentation side-surfaces include a first indentation side-surface adjacent the first recess side-surface and a second indentation side-surface adjacent the second recess side-surface, and wherein the first recess side-surface is separated from the first indentation side-surface by a first gap and the second recess side-surface is separated from the second indentation side-surface by a second gap.

28. The container of claim 27, wherein the first recess side-surface is parallel to the first indentation side-surface and the second recess side-surface is parallel to the second indentation side-surface.

* * * * *